United States Patent
Oyoung et al.

(10) Patent No.: US 7,663,272 B2
(45) Date of Patent: Feb. 16, 2010

(54) MOTOR HOUSING AND COOLING FIN ASSEMBLY

(75) Inventors: Shioping P. Oyoung, Fullerton, CA (US); Wei-Shing Chaing, Diamond Bar, CA (US)

(73) Assignee: Honeywell International Inc., Morristown, NJ (US)

( * ) Notice: Subject to any disclaimer, the term of this patent is extended or adjusted under 35 U.S.C. 154(b) by 106 days.

(21) Appl. No.: 11/872,411

(22) Filed: Oct. 15, 2007

(65) Prior Publication Data

US 2009/0096300 A1    Apr. 16, 2009

(51) Int. Cl.
*H02K 9/00* (2006.01)
(52) U.S. Cl. .............................. 310/54; 310/58; 310/89
(58) Field of Classification Search .................. 310/89, 310/54, 52, 64, 254, 218; 29/596
See application file for complete search history.

(56) References Cited

U.S. PATENT DOCUMENTS

| | | | |
|---|---|---|---|
| 6,300,693 B1 * | 10/2001 | Poag et al. ..................... | 310/54 |
| 6,617,715 B1 * | 9/2003 | Harris et al. .................. | 310/54 |
| 6,707,224 B1 | 3/2004 | Petersen | |
| 6,841,957 B2 | 1/2005 | Brown | |
| 6,927,509 B2 | 8/2005 | Cichetti | |
| 7,132,773 B2 | 11/2006 | Hans | |
| 7,414,339 B2 * | 8/2008 | Kitamura et al. .......... | 310/68 D |
| 7,538,468 B2 * | 5/2009 | Kobayashi et al. ............ | 310/89 |
| 2006/0197399 A1 | 9/2006 | Kataoka et al. | |

\* cited by examiner

*Primary Examiner*—Michael C Zarroli
(74) *Attorney, Agent, or Firm*—Oral Caglar, Esq.

(57) ABSTRACT

A motor housing and cooling fin assembly for an electric motor comprises a stator support having a longitudinal base and a series of fin plates protruding radially from the base, the fin plates for directing fluid coolant through the motor, a cylindrical support sleeve comprising a thin wall, the thin wall containing a series of slots for receiving distal ends of the fin plates; and a motor housing having a cylindrical inner wall, the support sleeve positioned between the stator support and the motor housing in an interference fit.

13 Claims, 6 Drawing Sheets

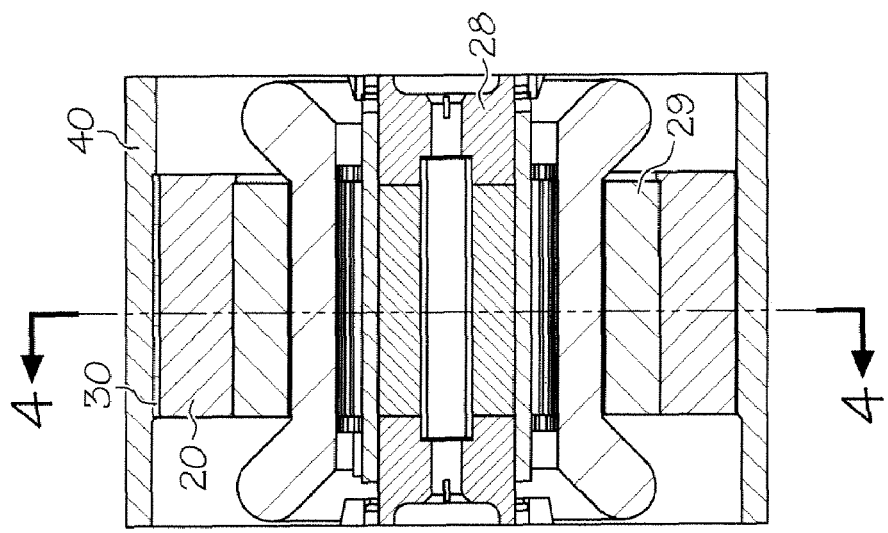
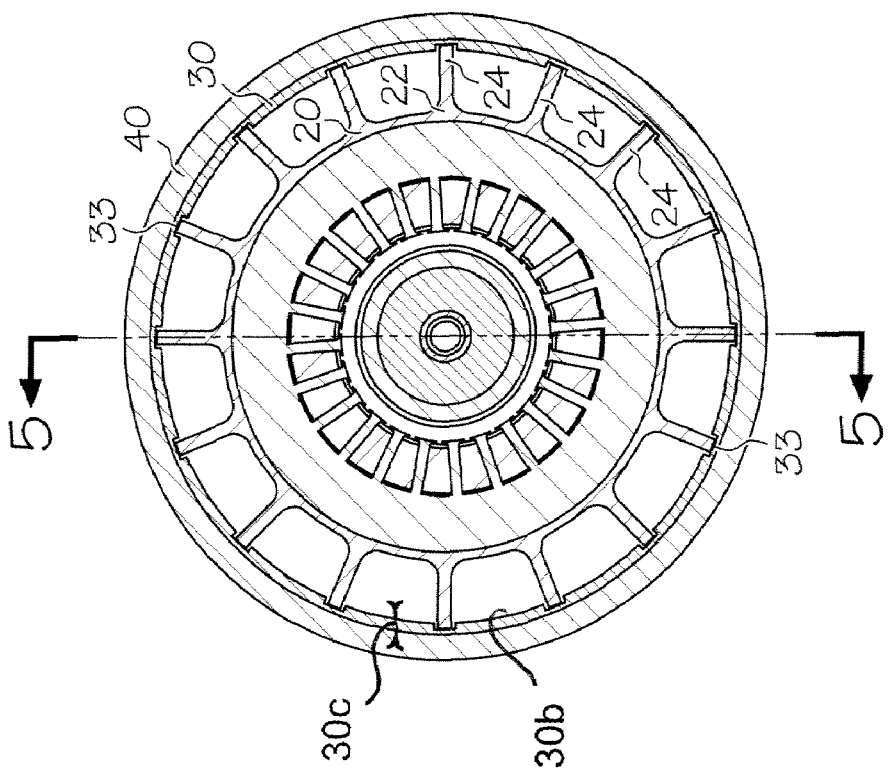
FIG. 5
FIG. 4

MOTOR HOUSING AND COOLING FIN ASSEMBLY

BACKGROUND OF THE INVENTION

The present invention generally relates to apparatus and methods for housing electric motors and, more particularly, to apparatus and methods for using low cost light weight motor housing for housing high power density electric motors.

Electric motors with high power density require effective cooling to remove a large amount of heat away from the stator or stator assembly during operation. This requirement is in order to prevent the motor from overheating, which could burn out the motor. Cooling the motor can be accomplished by circulating liquid coolant or cold air through a number of radially constructed fin plates surrounding a stator. While this is necessary, introducing such a design feature significantly increases the cost and weight of a motor.

In a conventional design of a motor housing having a cooling mechanism, the stator support assembly has fin plates which slide into longitudinal slots in the motor housing. In particular, the longitudinal slots are machined into the inner diameter of the motor housing. This machining process is costly because of the complex geometry of the motor housing. Because the slots that need to be machined into the motor housing have sharp corners, great care has to be taken while machining the slots to ensure that mistakes are not made that can predispose the motor housing to cracking at a later time during use. The fact that the exterior of the motor housing is irregular and is not a simple cylinder further increases the difficulty of machining the slots into the motor housing because the machining process typically requires the irregularly shaped motor housing to be positioned perfectly on the machines for milling. The increased difficulty adds to the time and cost of making the motor.

FIG. 1A and FIG. 1B show a high power density electric motor having a conventional motor housing 5, a stator support 7, a rotor assembly 8 and a stator assembly 9. Typically, motor housing for a high power density electric motor has an outer diameter OD of approximately 5 to 9 inches. A "conventional" motor housing is the motor housing that would be utilized without considering the teachings of the present invention. In a conventional motor, for example, although the thickness of the motor housing is typically minimized due to space limitations, for example in an aircraft or other application, the motor housing must be thick enough to receive and securely maintain, without undue stress or cracking, the sharp cornered slots, which are typically square or rectangular, for insertion of the fin plates of the cooling mechanism. As seen from FIG. 1A and FIG. 1B, the motor housing 5 also must have a thick wall in order to accommodate both the depth of the slots and the stress concentration effects at the inner corner of the slots. Since the longitudinal slots 6 in the motor housing have sharp corners, i.e. are rectangular or square, the mechanical stress associated with them is amplified by approximately two to three times at those local areas.

It is therefore useful to have a lower cost design for a high power density electric motor while still allowing for a suitable cooling mechanism to keep such an electric motor from burning out due to its generation of heat. Furthermore, there is a need to reduce the weight of such a motor, especially in the aerospace industry. In addition, there is a need to have a way to reduce the maximum stress in the outer housing derived from the presence of the adjacent cooling mechanism.

SUMMARY OF THE PRESENT INVENTION

In one aspect of the present invention, there is presented a motor housing and cooling fin assembly for an electric motor comprising a stator support having a longitudinal base and a series of fin plates protruding radially from the base; a cylindrical support sleeve having a wall, the wall containing a series of slots for receiving distal ends of the fin plates; and a motor housing having a cylindrical inner wall, the support sleeve positioned between the stator support and the motor housing in an interference fit.

In another aspect of the invention, there is presented a method of cooling a high power density electric motor during its operation, the method comprising calculating a thickness of a motor housing so as to accommodate placement of a cylindrical support sleeve adjacent the motor housing; forming a motor housing whose inner wall is cylindrical; heating and enlarging the motor housing so that the inner diameter of the motor housing increases from being smaller than an outer diameter of the cylindrical support sleeve to being larger than the outer diameter of the cylindrical support sleeve; inserting the cylindrical support sleeve inside the motor housing; allowing the motor housing to cool so as to create an interference fit between the motor housing and the cylindrical support sleeve; and circulating a coolant through the motor during operation of the motor.

In a further aspect of the invention, there is presented an assembly comprising a longitudinal outer housing having an irregularly shaped exterior and a cylindrical inner wall, a longitudinal internal support assembly inside the outer housing including a plurality of radially protruding elements; a cylindrical support sleeve containing a plurality of cornered longitudinal slots for receiving distal ends of the radially protruding elements; the cylindrical support sleeve positioned between the internal support assembly and the outer housing in an interference fit, and a combined thickness of the cylindrical support sleeve and outer housing being approximately 0.2 inches or less.

These and other features, aspects and advantages of the present invention will become better understood with reference to the following drawings, descriptions and claims.

BRIEF DESCRIPTION OF THE DRAWINGS

FIG. 4 is a vertical sectional view of the motor of FIG. 2 taken along line 4-4 of FIG. 5, including the assembly of FIG. 3;

FIG. 5 is a horizontal sectional view of the motor of FIG. 2 taken along line 5-5 of FIG. 4;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a motor housing and cooling fin assembly for a high power density electric motor, such as those found in the aerospace industry and those used in industrial control machinery. Generally, in terms of electric motors, a power density exceeding six horsepower per pound of weight (hp/lb) may be considered a "high power density".

In both conventional motors and in the motor of the present invention, the high power density electric motor may generate a substantial amount of heat and may be cooled by circulating liquid coolant or cold air through a number of radially projecting fin plates of the stator support. Using the present invention, this cooling mechanism can be accomplished without significantly increasing the cost and weight of the electric motor. This is because the motor housing is reduced in thickness (as compared to the thickness of the motor housing of conventional high power density electric motors) and the fin plates fit directly into a series of slots that are more easily machined into a thin cylindrical support sleeve of simple geometry, which support sleeve is fitted between the thin motor housing and the stator support with an interference fit. Accordingly, the electric motor does not unnecessarily add to the weight of the aircraft.

In contrast to the prior art, which utilizes a motor housing, if made of aluminum, of approximately 0.4 inches wall thickness for a high power density electric motor, the motor housing and cooling fin assembly of the present invention utilizes an motor housing combined with a cylindrical support sleeve which together have a thickness of less than 0.2 inches, less than half the conventional motor housing. As a result, in contrast to the prior art, the electric motor of the present invention may be light weight for a high power density electric motor. In further contrast to the prior art, which does not make use of a cylindrical support sleeve between the motor housing and the stator support, and requires the expensive and difficult process of machining slots for the fin plates directly into a thick motor housing of complex geometry, the motor housing and cooling fin assembly of the present invention may use a thin cylindrical support sleeve of simple geometry, i.e. a cylinder, into which the series of slots for the fin plates are machined. This design may reduce the overall cost of the electric motor and may make it more affordable though it contains a special cooling mechanism.

Figure 2:
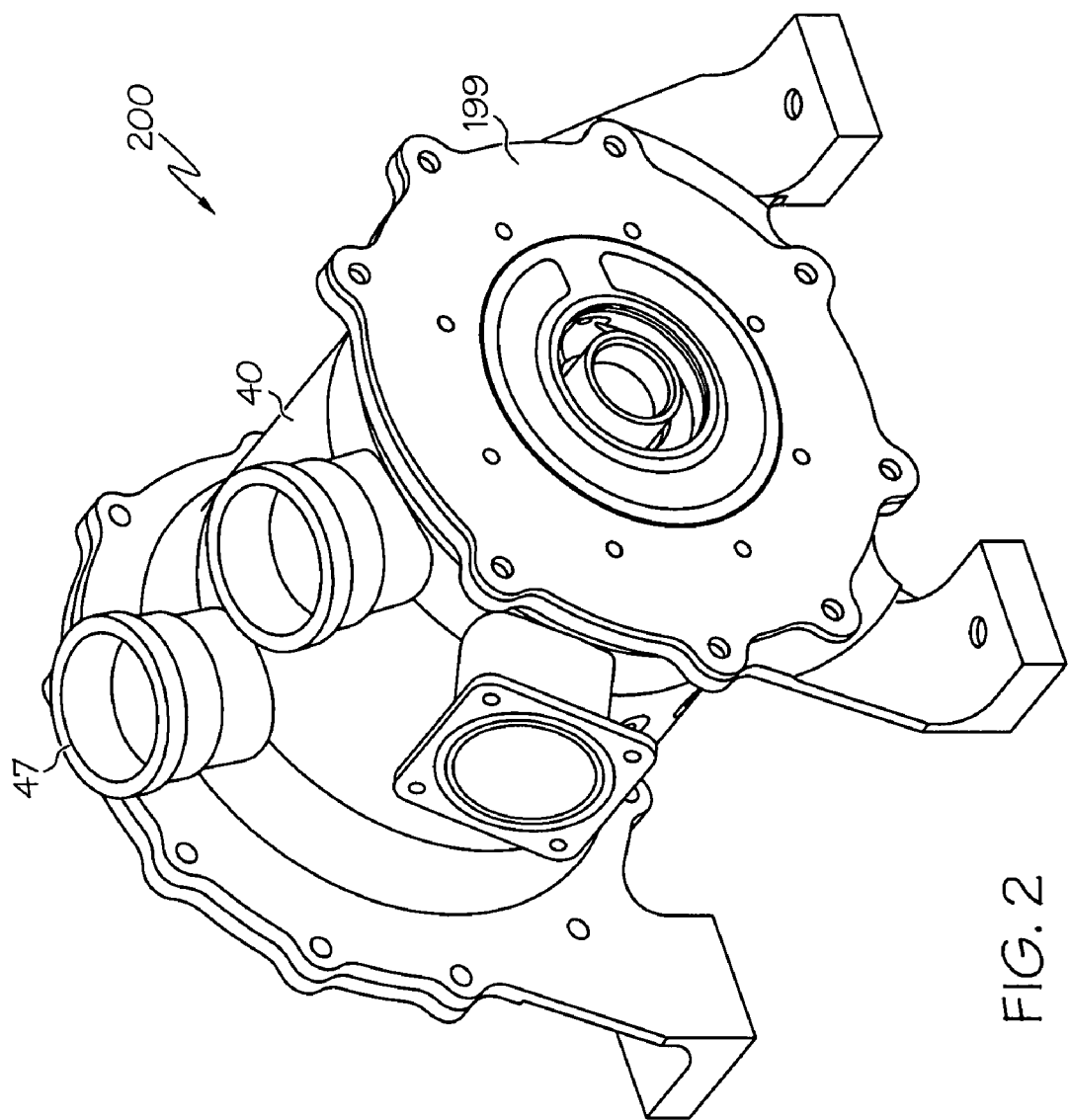
FIG. 2 is a perspective view of a high power density electric motor in accordance with the present invention.
Figure 3:
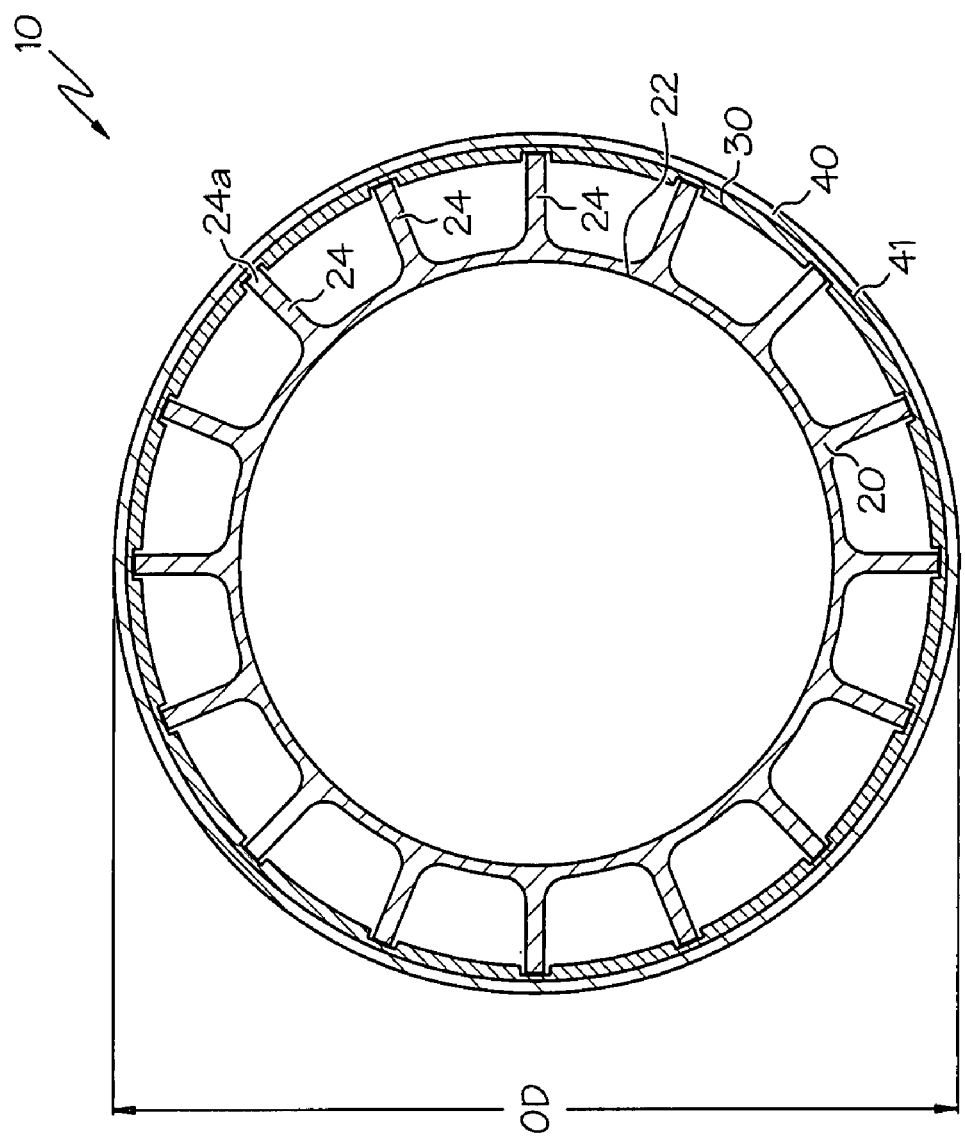
FIG. 3 is a sectional view of the assembly of the present invention.

As seen from FIG. 2, the high power density electric motor 200 (showing end cap 199) that uses the assembly 10 of the present invention may have a motor housing 40 whose exterior 47 may be irregular, or of complex geometry. As seen from FIG. 3, the motor housing and cooling fin assembly 10 for electric motor 200 may include a stator support 20, a cylindrical support sleeve 30 and a motor housing 40. FIG. 5 also shows other elements of high power density electric motor 200, including its stator/stator assembly 29 and its rotor assembly 28.

Stator support 20, which may be located inside cylindrical support sleeve 30 and by definition also inside housing 40, may comprise a longitudinal base 22 and a series of fin plates 24 protruding radially from base 22. Base 22 may be generally cylindrical. Fin plates 24 may direct fluid coolant, i.e. air or a liquid, through the motor through a length of the stator support 20. Fin plates 24 may direct the fluid coolant from one end of motor 200 to the other end.

As seen from FIG. 4, cylindrical support sleeve 30 may include a thin wall 30b that contains a series of slots 33 for receiving distal ends 24a of fin plates 24. The exact thickness of cylindrical support sleeve 30 may vary with the application. In a high power density electric motor made of aluminum, for example, cylindrical support sleeve 30 may have a thickness of less than 0.1 inches since its thickness combined with the thickness of motor housing 40 may be less than approximately 0.2 inches. Cylindrical support sleeve 30 may be of uniform thickness 30c, although in other cases cylindrical support sleeve 30 may be of varied thickness.

Slots 33 may be longitudinal in that they may extend for all or most of the length of the motor 200. Slots 33 may also be cornered and in particular may have sharp corners. Specifically, slots 33 may be rectangular or square, or may have a curved shape. Since cylindrical support sleeve 30 may be of simple geometry, machining slots 33 into cylindrical support sleeve 30 may be easier and less costly.

Motor housing 40 may be generally longitudinal and may have an inner wall 41 that is cylindrical and may have an outer diameter OD that varies due to the irregularity or complex geometry of the exterior of motor housing 40 (see FIG. 2). The exterior of motor housing 40 may be of any shape motor housing suitable for that particular high power density electric motor or other electric motor that it is serving to house. The thickness of motor housing 40 may have been reduced to accommodate at least the thickness of a cylindrical support sleeve 30. In fact, motor housing 40 may be reduced more than that and may have a thickness such that its own thickness combined with the thickness of cylindrical support sleeve 30 is significantly less than the thickness of a conventional motor housing.

Figure 1B:
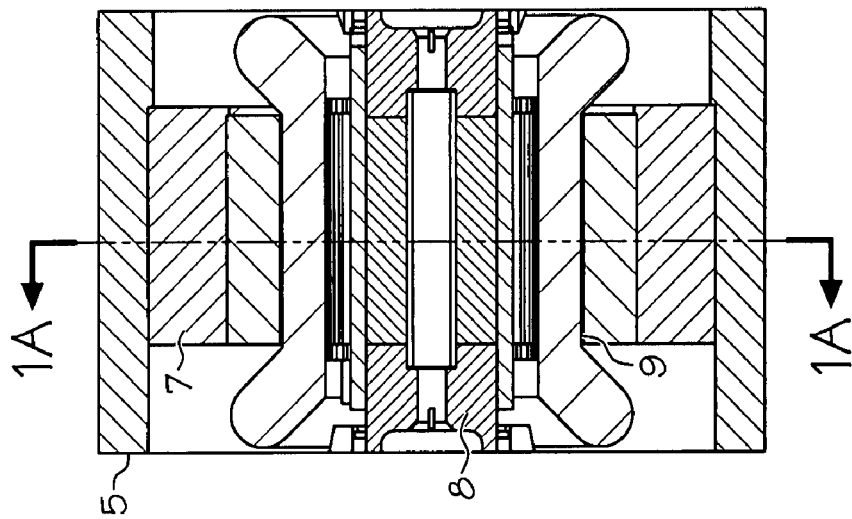
FIG. 1B is a longitudinal sectional view of the motor of FIG. 1A.
Figure 1A:
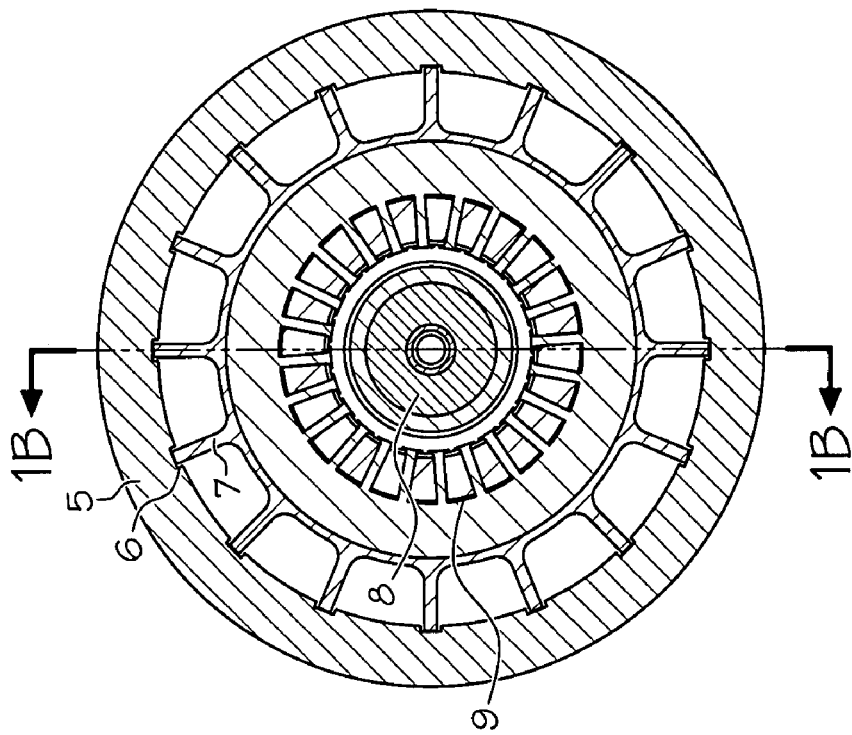
FIG. 1A is a horizontal sectional view of a high power density electric motor having a conventional motor housing of the prior art.

As can be seen from FIGS. 1A and 1B, the conventional motor housing is comparatively thick, and if one compares this thickness to the thickness of the motor housing 40 shown in FIG. 4 and FIG. 5, one can see that the motor housing 40 of the present invention may be considerably thinner.

In addition, one can see from FIG. 4 and FIG. 5 that the conventional motor housing of FIG. 1A and FIG. 1B may even be significantly thicker than the combined thicknesses, in the motor of the present invention, of cylindrical support sleeve 30 and motor housing 40. For example, a combined thickness of cylindrical support sleeve 30 and outer housing 40 may be less than approximately 0.2 inches if housing 40 and ring 30 are made of aluminum, whereas the motor housing of a conventional high power density electric motor may be approximately 0.4 inches if made of aluminum. As a result, the overall outer diameter OD of motor housing 40 and the overall outer diameter OD of motor 200 may be reduced. In the process, moreover, motor housing 40 may be of lighter weight.

Motor housing 40, cylindrical support sleeve 30 and stator support 20 may be of approximately equal length since they may run the length of motor 200.

The motor housing and cooling fin assembly 10 may further comprise cylindrical support sleeve 30 positioned between stator support 20 and motor housing 40 in an interference fit. The interference fit may be created by using a motor housing that is thinner than it otherwise be, to the point of being able to accommodate insertion of cylindrical support sleeve 30 and still be less thick than a motor housing without cylindrical support sleeve 30, and then inserting cylindrical support sleeve 30 into motor housing while motor housing is hot and enlarged. When motor housing 40 cools down, an interference fit may be created.

As a result of the interference fit, motor housing 40 is at all times compressing support sleeve 30. This constant tension from the constant hoop compression force that support sleeve 30 is under may mean that support sleeve 30 may not prone to cracking and may not crack.

Figure 6:
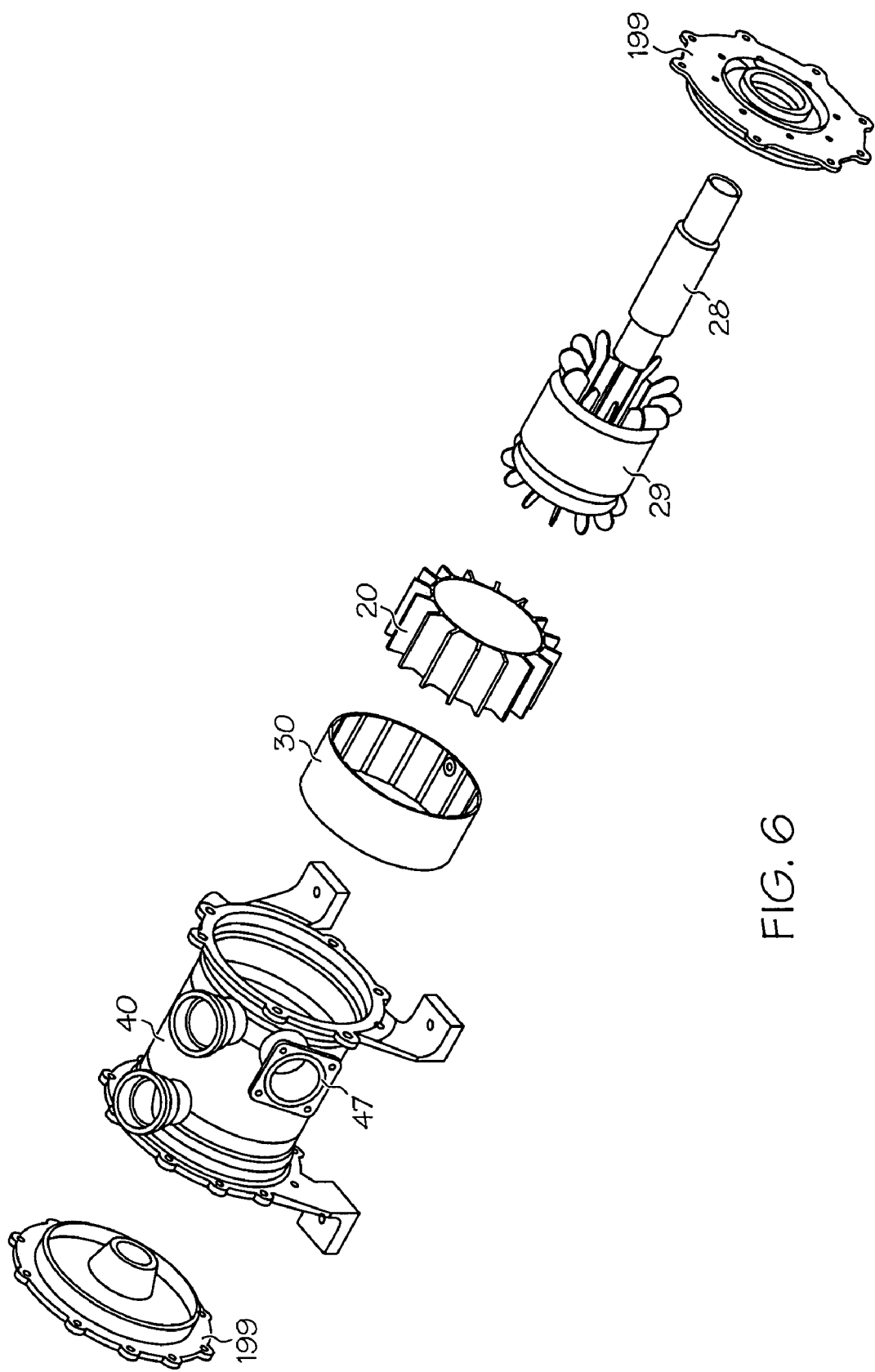
FIG. 6 is an exploded view of the motor of FIG. 2.

As seen from FIG. 6, motor 200 may comprise motor housing 40, cylindrical support sleeve 30 and stator support 20 of assembly 10 and may also comprise stator 29 and rotor assembly 28, which are all located between end caps 199. Furthermore, the irregular exterior 47 of motor housing 40 is visible from FIG. 6.

Figure 7:
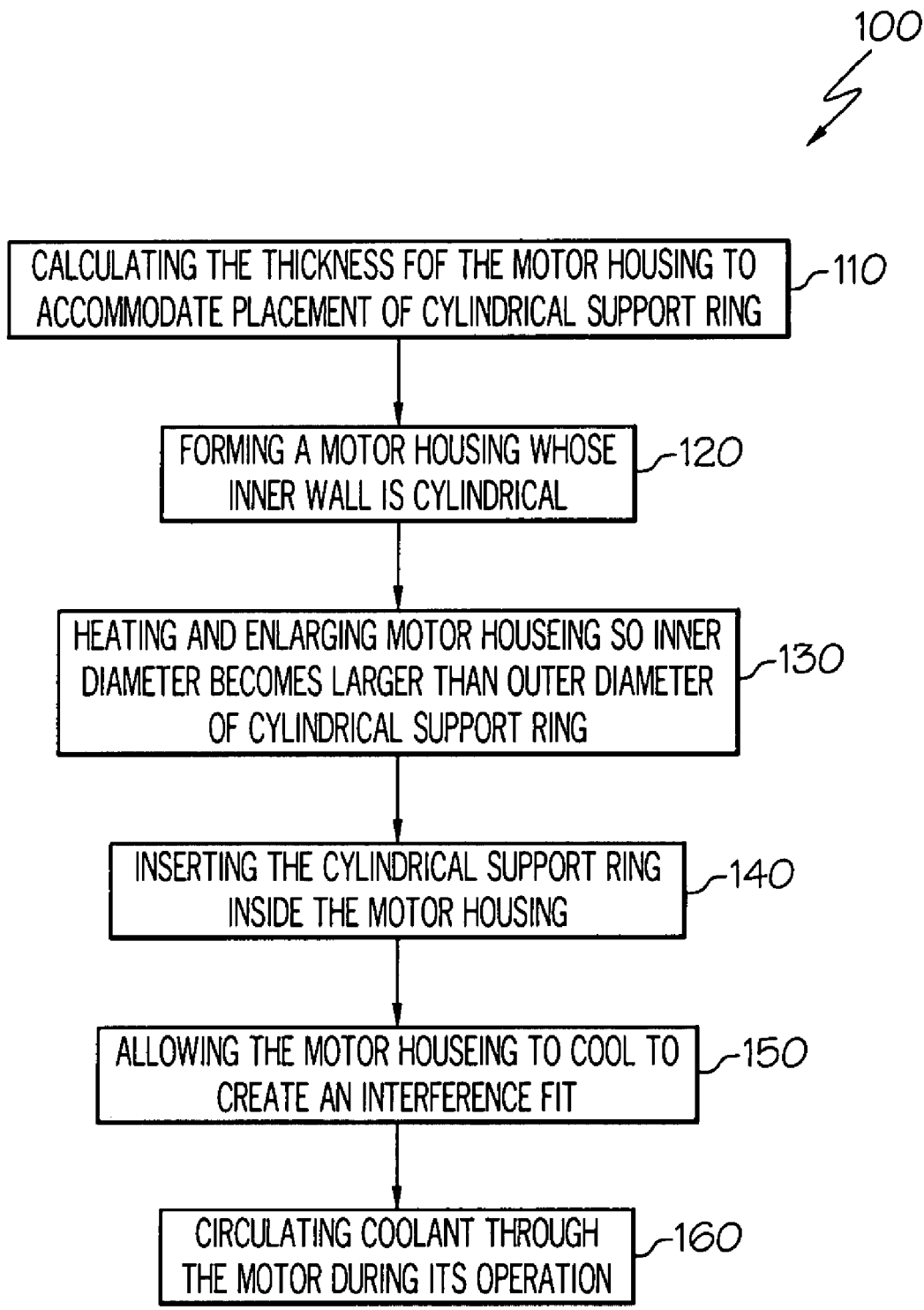
FIG. 7 is a flow chart showing a method of the present invention.

As seen from FIG. 7, the present invention may also be expressed as a method 100 of making a light weight low cost motor housing and cooling fin assembly for a high power density electric motor. In accordance with such a method 100, when motor housing 40 is formed, in step 110, its thickness may be calculated so as to accommodate placement of a cylindrical support sleeve 30 adjacent to the motor housing 40. In effect, motor housing 40 may be reduced in the area of its inner wall 41 which means that the inner diameter ID of motor housing 40 may be increased without a corresponding increase in the outer diameter OD of motor housing 40.

The thickness of motor housing 40 may be calculated to accommodate placement of cylindrical support sleeve 30 while achieving a reduced overall size of the electric motor as measured by the outer diameter of the electric motor. This is because the thickness of motor housing 40 may be reduced by an amount that exceeds the thickness of cylindrical support sleeve 30.

In step 120, motor housing 40 may be formed having an inner wall that may be cylindrical. Although the exterior of motor housing 40 may be of complex geometry and may be generally irregularly shaped, as seen in FIG. 2, inner wall 41 of motor housing 40 remains cylindrical. Thus, the inner diameter ID of motor housing 40 may be increased to accommodate more than the thickness of a cylindrical support sleeve.

In a further step 130 of method 100, motor housing 40 may be heated to an elevated temperature. In doing so, motor housing 40 may be enlarged. This step 120 of heating can be accomplished in any number of ways. Those skilled in the art, for example, may suggest accomplishing this by heating motor housing 40 in an oven. This heating of motor housing 40 to an elevated temperature may cause motor housing 40 to expand so that the inner diameter ID of motor housing 40 increases from being smaller than the outer diameter OD of cylindrical support sleeve 30 to being slightly larger than the outer diameter OD of cylindrical support sleeve 30.

Method 100 may further include a step 140 wherein while motor housing 40 is still heated and in an enlarged state, cylindrical support sleeve 30 may be inserted into motor housing 40 so that support sleeve 30 may be inside motor housing 40. Stator support 20 may have already been placed inside cylindrical support sleeve 30 when inserting cylindrical support sleeve 30 inside motor housing 40. Furthermore, stator 29 may have already been placed inside stator support 20 when stator support 20 is placed inside cylindrical support sleeve 30. In step 150, motor housing 40 may then be allowed to cool, for example to room temperature, so as to create an interference fit between motor housing 40 and cylindrical support sleeve 30. Finally, in step 160, coolant may be circulated through the motor during its operation. The coolant may be guided by fin plates 24 of stator support 20.

It should be understood, of course, that the foregoing relates to exemplary embodiments of the invention and that modifications may be made without departing from the spirit and scope of the invention as set forth in the following claims.

We claim:

1. A motor housing and cooling fin assembly for an electric motor comprising:
    a stator support having a longitudinal base and a series of fin plates protruding radially from the base;
    a cylindrical support sleeve including a uniform thickness, the cylindrical support sleeve further having a sleeve wall, the sleeve wall containing a series of slots disposed within the uniform thickness and disposed to receive in direct contact, distal ends of the fin plates within the uniform thickness; and
    a motor housing having a cylindrical inner wall,
    the support sleeve positioned between the stator support and the motor housing cylindrical wall in an interference fit.

2. The motor housing and cooling fin assembly of claim 1, wherein the slots have corners.

3. The assembly of claim 1, wherein the base is generally cylindrical.

4. The assembly of claim 1, wherein the electric motor is a high power density electric motor.

5. The assembly of claim 1, wherein the fin plates extend throughout a length of the stator support.

6. The assembly of claim 1, wherein a thickness of the motor housing combined with the uniform thickness of the cylindrical support sleeve is less than approximately 0.2 inches.

7. An assembly, comprising:
    a longitudinal outer housing having an irregularly shaped exterior and a cylindrical inner wall,
    a longitudinal internal support assembly inside the outer housing including a plurality of radially protruding elements;
    a cylindrical support sleeve containing a plurality of cornered longitudinal slots disposed to receive distal ends of each of the radially protruding elements within the longitudinal slots;
    the cylindrical support sleeve positioned between the internal support assembly and the outer housing in an interference fit, and
    a combined thickness of the cylindrical support sleeve and outer housing being approximately 0.2 inches or less.

8. The assembly of claim 7, wherein the radially protruding elements of the longitudinal internal support assembly are fin plates directing coolant through the internal support assembly.

9. The assembly of claim 7, wherein the radially protruding elements extend throughout a length of the cylindrical support sleeve.

10. The assembly of claim 7, wherein the cylindrical support sleeve is under a constant hoop compression force and is not prone to cracking.

11. The assembly of claim 7, wherein the cornered slots are square or rectangular.

12. The assembly of claim 7, wherein the longitudinal outer housing, the cylindrical support sleeve and the longitudinal internal support assembly are of approximate equal length.

13. The assembly of claim 7, wherein the cylindrical support sleeve is of uniform thickness.

* * * * *